United States Patent [19]

Pisano

[11] Patent Number: 4,901,105

[45] Date of Patent: Feb. 13, 1990

[54] CONSTANT VELOCITY OPTICAL SCANNING SYSTEM

[75] Inventor: Albert P. Pisano, Berkeley, Calif.

[73] Assignee: Xerox Corporation, Stamford, Conn.

[21] Appl. No.: 311,242

[22] Filed: Feb. 16, 1989

[51] Int. Cl.⁴ .................. G03B 27/50; G03B 27/70
[52] U.S. Cl. .................................... 355/51; 355/60; 355/66
[58] Field of Search .............. 355/49, 51, 60, 65, 355/66, 235

[56] References Cited

U.S. PATENT DOCUMENTS

| | | | |
|---|---|---|---|
| 3,498,712 | 3/1970 | Kolibas et al. | 355/66 |
| 3,612,679 | 10/1971 | Punnett | 355/235 |
| 3,697,167 | 10/1972 | Hamaker et al. | 355/66 |
| 4,035,075 | 7/1977 | Sprado | 355/66 |
| 4,623,239 | 11/1986 | Zambelli | 355/66 |

FOREIGN PATENT DOCUMENTS 298919  3/1971  U.S.S.R. .

OTHER PUBLICATIONS

"Optics/Scanning For Copier with Stationary Flat Document Plane" by C. A. Queener, IBM Technical Disclosure Bulletin, vol. 15, No. 9, Feb. 1973, pp. 2683–2686.

Primary Examiner—L. T. Hix
Assistant Examiner—D. Rutledge
Attorney, Agent, or Firm—Robert A. Chittum

[57] ABSTRACT

A compact mechanical linkage apparatus is disclosed to drive an optical scanning device underneath and parallel to a stationary transparent platen of a reproduction machine. The scanning device includes a carriage having an optical lens assembly. The carriage is adapted to move relative to the machine frame and on guide means for guiding the carriage along a path of travel parallel to the platen whereby successive incremental regions of the document or other object on the platen are scanned and the incremental light image formed by the scanning means are directed to the image receiving member. The carriage is driven along its scanning length by a multiple link mechanism having an input link adapted for full revolution at a constant speed and a one of its links slidably connected to the carriage for imparting thereto a straight line motion at constant speed. The imparted motion includes a forward direction from a start of scan position and an automatic return to the start of scan position after the scan length has been completed. A drive means for imparting a constant angular speed to the input link of the multiple link mechanism provides motivation for the carriage along its scanning distance without the need for cams, clutches, cables or pulleys and the carriage velocity is maintained within about 2% velocity accuracy.

11 Claims, 1 Drawing Sheet

CONSTANT VELOCITY OPTICAL SCANNING SYSTEM

BACKGROUND OF THE INVENTION

1. Field of the Invention

This invention relates to a compact mechanical linkage system for driving a scanning system, and more particularly to a scanning system driven by a six-link mechanism adapted to transport a scanning carriage at constant speed.

2. Description of the Prior Art

Scanning devices such as those used in photocopying machines form a light image of the document being copied by successively illuminating incremental portions of the document. The light image formed by the scanning apparatus is usually projected through a lens and focused onto an image receiving member, such as a photoconductive belt or drum, which is then used to make a visible copy of the document. The operating cycle of such scanning devices normally consist of two phases, a scanning phase in which the scanning device is moved from a start of scan to an end of scan position, and a restoring phase in which the scanning device is returned to the start of scan position. During the scanning phase, the illuminating means moves across the document being copied from a start of scan position to an end of scan position to illuminate the document increment by increment thereby forming a light image of the information on the document. After the portion of the document to be copied is completely scanned, the scanning phase is completed and the illuminating means is then returned to the start of scan position.

Scanning systems employing scan carries which move parallel to a document platen are well known in the art. For these scan systems, a document is placed on a stationary transparent platen and a group of optical components are mounted on one or more carriages reciprocally located beneath the platen for parallel movement therewith. These optical components typically include an illumination lamp and a mirror on a full rate carriage and a mirror on a half-rate carriage. As these carriages move at their respective rates a document on the platen is incrementally scanned and illuminated and the image of the document is projected by a lens onto a photosensitive medium, typically a photoreceptor drum or belt.

These prior art scan carriages are driven by a combined mechanical/electrical arrangement wherein motion is imparted to the carriage from a main drive shaft via electrically operated solenoids, pulleys, and drive belts or cables. A purely mechanical drive arrangement which does not require the use of cables, pulleys and clutch mechanisms is very desirable, both from the standpoint of economy and simplicity.

U.S. Pat. No. 4,623,239 to Zambelli, discloses a document scanning apparatus which provides a scan and re-scan motion to a scan carriage using only mechanical drive components. The motion of a rotating photoreceptor is transferred via drive pulley components to a main drive shaft having a pair of pulleys fixedly mounted at the ends. The pulleys drive cables which in turn drive the scan carriages of the disclosed system in a scan or re-scan direction, dependent upon the drive pulley rotation. The drive pulley rotation is controlled by a movable hub assembly on a drive shaft and by a linkage mechanism which is periodically engaged by the scan carriage at the beginning or end of scan position. Mechanical engagement of the scan carriage with the linkage mechanism causes a reversal of the drive pulley rotation and hence a reversal of the scan carriage direction of travel.

U.S. Pat. No. 4,035,075 to Sprado, discloses an image scanning system for a copying machine, wherein a document may be supported on a fixed plane and the image thereon scanned by a scanning mirror arranged to sweep past the document and, by the use of a series of mirrors, will position the image on a drum rotated on an axis parallel to the direction of movement of the scanning mirrors. This scanning system utilizes a first and second carrier which are moved relative to each other and driven by a cam and linkage affording initially movement of the mirrors from a home position across the scanning area to a start position to begin the scanning mode at a uniform speed. The driving force of the scanning system is controlled by a cam which provides continuous controlled acceleration, velocity and displacement of the scanning mirrors.

U.S. Pat. No. 3,612,679 to Punnett discloses a scanning device for focusing a flowing light image of a stationary original upon a moving image retaining member. The scanning components involved are positively driven by a single drive arm, and the motion imparted thereto synchronized with the moving image retaining member by a cam having a working profile in operative communication with a cam follower on the driving arm.

U.S. Pat. No. 3,697,167 to Hamaker et al discloses an optical projection apparatus for projecting a flowing image of a stationary original on a moving image plane. The apparatus moves lamps and an optical component from a single cam and a linearly driven cam follower moving synchronously with the moving image plane. Crank arms connect from the cam follower arm to concentric shafts driving the lamps and mirror in synchronous movement with the moving image plane.

Soviet Patent No. 298919 discloses an assembly composed of levers, sliders and linkages designed to move an image at a speed proportional to the movement of the photosensitive surface.

SUMMARY OF THE INVENTION

It is an object of the present invention to provide a drive arrangement for a document scanning system which utilizes solely mechanical components to drive a scanning system in a scan and re-scan mode of operation.

It is another object of the invention to provide a rigid body mechanical drive linkage system for an optical scanning system having a constant velocity over the predetermined scan length with velocity errors of about 2% or less.

In the present invention, a compact mechanical linkage apparatus is used to drive an optical scanning device underneath and parall3el to a stationary transparent platen of a reproduction machine. An original document or other object may be placed on the platen for scanning thereof for the purpose of directing a light image of the document or other object generated by the optical scanning device upon a moving image receiving member. The scanning device has a frame containing the transparent platen fixedly mounted thereon, and a carriage having an optical scanning means. The carriage is adapted to move relative to the frame and on guide means for guiding the carriage along a path of travel parallel to the platen whereby successive incremental regions of the document or other object on the platen are scanned and the incremental light image formed by the scanning means are directed to the image receiving member. The carriage is driven along its scanning length by a multiple link mechanism having an input link adapted for full revolution at a constant speed and a one of its links slidably connected to the carriage for imparting thereto a straight line motion at constant speed. The imparted motion includes a forward direction from a start of scan position and an automatic return to the start of scan position after the scan length has been completed. A drive means for imparting a constant angular speed to the input link of the multiple link mechanism provides motivation for the carriage along its scanning distance without the need for cams, clutches, cables or pulleys and the carriage velocity is maintained within about 2% velocity accuracy.

A more complete understanding of the present invention can be obtained by considering the following detailed description in conjunction with the accompanying drawing.

DESCRIPTION OF THE PREFERRED EMBODIMENT

Figure 1:
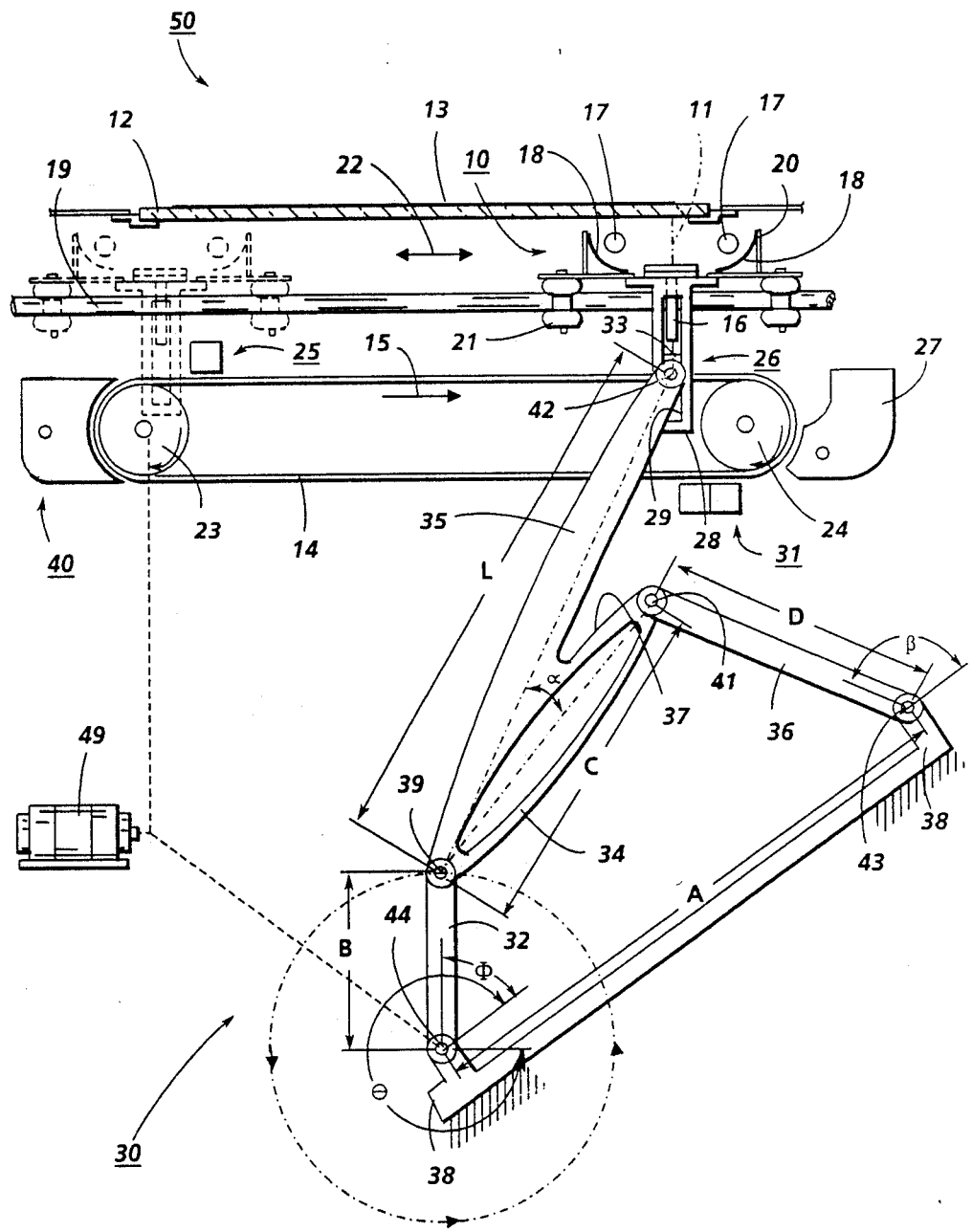
FIG. 1 represents a side schematic view of a document reproduction machine embodying the scanning arrangement of the present invention.

The present invention is a optical scanning system driven by a compact, mechanical linkage arrangement at a constant velocity with velocity errors of about 2% or less over the entire scan length of the scanning system. Although the scanning system has many applications, it will be described within the environment of a reproduction machine in which an original document is scanned by the scanning system and the light image resulting therefrom is projected onto a photoreceptor member where a copy of the original document is formed.

Referring to FIG. 1, a schematic representation of a reproductin machine 50 employing a photoreceptor member in the form of a belt 14 is shown in combination with the optical scanning system 10 of the present invention. The optical scanning system includes an object surface or transparent platen 12 having an original document 13 placed thereon, and a Selfoc ® lens assembly 16 with lamps 17 and reflectors 18 mounted on a carriage 20. The carriage has guide rollers 21 and is reciprocally driven by the mechanical linkage arrangement 30 along fixed guide rails 19 in a direction parallel to the platen as depicted by arrow 22. An optical path 11, shown in dashed line, extends between the platen and the photoreceptor belt, and is representative of the path of the principal ray of light reflected from the document, through the Selfoc ® lens assembly disposed along the path, and to the belt. The photoreceptor belt is mounted on rollers 23,24 which in turn are journaled in the frame (not shown) that supports and houses the reproduction machine components. The photoreceptor belt is driven at a constant velocity by a drive motor 49. This same motor, through appropriate gearing (not shown) drives the input link 32 of the linkage arrangement 30, which in turn drives the carriage 20 through a slotted connector plate 28 fixed thereto, discussed more fully later. Alternatively, a separate motor (not shown) could drive the linkage arrangement through input link 32.

In operation, the carriage 20 is reciprocally moved parallel to the platen by the linkage arrangement 30 from a start-of-scan position shown in solid line to an end-of-scan position shown in dashed line. The scan length distance between start and end positions is about nine inches or 22.86 cm. The velocity of the carriage is maintained constant within about 2% velocity error for a range of predetermined velocities suitable for making 10 to 30 scans per minute. This translates to about 10 to 30 copies per minute by the reproduction machine 50. The belt moves at a predetermined constant velocity in the opposite direction, so that a composite image of the incrementally scanned document is reflected from the object surface or platen surface and projected by the lens assembly 16 onto the surface of the belt. At the end-of-scan position, the carriage shown in dashed line is returned to the start-of-scan position automatically.

The various processes for producing an output copy of the exposed original document as well known in the art and hence a detailed description is not herein provided. Briefly however, at station 25 an electrostatic charge is placed uniformly over the surface of the rotating belt 14. The charged belt surface is then moved through an exposure station 26, where the flowing light image of the document 13 is imaged on the belt surface. As a result of this imaging operation, the charge on the belt surface is selectively dissipated in the light-exposed region, thereby recording the original input information on the belt surface in the form of a latent electrostatic image. Next, in the direction of belt rotation, the image bearing belt surface is transported through a development station 27 wherein a toner material is applied to the charged surface, thereby rendering the latent electrostatic image visible. The now developed image is brought into contact with a sheet of final support material (not shown), such as paper or the like, within a transfer station 31 wherein the toner image is electrostatically attracted from the belt surface to the contacting side of the support sheet. Station 40 represents a mechanism for cleaning toner for the belt surface. A fusing station (not shown) permanently fixes the transferred image on the support sheet. These xerographic stations and their functions are more fully described in U.S. Pat. No. 4,318,610 whose contents are hereby incorporate by reference.

The linkage arrangement 30 which drives the carriage 20 has a four-bar mechanism comprising an input link 32, coupler link 34, output link 36, and a fixed link 38. The coupler link has affixed to it and extension 35 of length "L" at an angle $\alpha$ from one of its elongated sides or "backbone" 37. This length L is the distance between the pin 39 connecting input link 32 and coupler link 34 and the pin 42 connecting the extension 35 to the slider 33. The point at the entreme end of the coupler link extension 35 is attached to slider 33 via pin 42. Slider 33 moves along slot 29 of connector plate 28 fixedly attached to the carriage 20. The carriage is attached to the fixed guide rails 19 via guide rollers 21.

In order to eliminate the need for clutches, the input link 32 is directly coupled to a constant speed driveshaft (not shown) of an appropriate gear or drive belt arrangement (not shown) driven by the motor 49 driving the photoreceptor belt 14 or optionally by a separate motor not shown. This requires that the input link 32 make full revolutions at a constant speed. Accordingly, all four link mechanisms must be the crank-rocker or double crank variety. The distance between the pins 39,44 connecting the input link to the coupler link 34 and fixed link 38 is the length "B". The distance between the pins 39,41 connecting the coupler link to the input link and the output link 36 is the length "C". The distance between the pins 41,43 connecting the output link 36 to the coupler link 34 and the fixed link 38 is length "D". Finally, the distance between pins 43,44 connecting the fixed link 38 to the input link 32 and output link 36 is length "A".

The seven strongest candidates for a constant velocity, carriage-driving, linkage arrangement are delineated below, wherein all dimensions are in inches, all velocities are in inches per second, and all angles are in degrees. The fraction of time the carriage is scanning in the forward direction (i.e., from start-of-scan to end-of-scan) within the stated velocity accuracy is $\sigma$. The velocity error is $\epsilon$. The maximum driving torque (inch pounds) that is reflected back to the driving shaft (not shown) at throughputs of 20 copies per minute is called MDT. As stated above, angle $\alpha$ is that angle of the coupler extension 35 with the backbone 37 of the coupler link 34. Angle $\theta$ is the angle of orientation between the direction of carriage motion and the fixed link 38 as it is mounted in the frame of the reproduction machine. The angle $\Phi$ denotes the angle and direction of rotation of the input link relative to the fixed link or frame. The angular speed of the input link is constant. The angle $\beta$ is the angle and direction of rotation of the output link relative to the fixed link or frame.

| Case 1 | | | |
|---|---|---|---|
| A = 3.726 | B = 2.795 | C = 5.217 | D = 4.472 |
| $\alpha$ = 7.070° | L = 10.649 | $\theta$ = 189.242° | $\epsilon$ = 1.79% |
| $\sigma$ = 0.409 | MDT = 28.0 | SWEPT AREA = 16.2" × 12.9" | |

| Nominal Scan Speed | | Maximum Carriage Acceleration | |
|---|---|---|---|
| in/sec | @ cpm | g's | @ cpm |
| 3.00 | 30 | 4.19 | 30 |
| 2.00 | 20 | 1.86 | 20 |
| 1.00 | 10 | 0.47 | 10 |

| Case 2 | | | |
|---|---|---|---|
| A = 3.778 | B = 2.267 | C = 5.742 | D = 4.533 |
| $\alpha$ = 354.773° | L = 13.296 | $\theta$ = 161.002° | $\epsilon$ = 1.33% |
| $\sigma$ = 0.402 | MDT = 5.60 | SWEPT AREA = 16.0" × 16.0" | |

| Nominal Scan Speed | | Maximum Carriage Acceleration | |
|---|---|---|---|
| in/sec | @ cpm | g's | @ cpm |
| 3.00 | 30 | 1.64 | 30 |
| 2.00 | 20 | 0.73 | 20 |
| 1.00 | 10 | 0.18 | 10 |

| Case 3 | | | |
|---|---|---|---|
| A = 3.895 | B = 2.921 | C = 4.869 | D = 4.674 |
| $\alpha$ = 12.182° | L = 9.493 | $\theta$ = 195.310° | $\epsilon$ = 2.01% |
| $\sigma$ = 0.413 | MDT = 11.0 | SWEPT AREA = 15.2" × 11.4" | |

| Nominal Scan Speed | | Maximum Carriage Acceleration | |
|---|---|---|---|
| in/sec | @ cpm | g's | @ cpm |
| 2.85 | 30 | 2.39 | 30 |
| 1.90 | 20 | 1.06 | 20 |
| 0.85 | 10 | 0.27 | 10 |

| Case 4 | | | |
|---|---|---|---|
| A = 3.982 | B = 2.389 | C = 5.734 | D = 4.779 |
| $\alpha$ = 357.609° | L = 12.944 | $\theta$ = 157.520° | $\epsilon$ = 1.46% |
| $\sigma$ = 0.402 | MDT = 3.2 | SWEPT AREA = 16.4" × 16.4" | |

| Nominal Scan Speed | | Maximum Carriage Acceleration | |
|---|---|---|---|
| in/sec | @ cpm | g's | @ cpm |
| 2.85 | 30 | 1.22 | 30 |
| 1.90 | 20 | 0.54 | 20 |
| 0.85 | 10 | 0.14 | 10 |

| Case 5 | | | |
|---|---|---|---|
| A = 4.137 | B = 3.103 | C = 5.585 | D = 4.964 |
| $\alpha$ = 7.302° | L = 10.876 | $\theta$ = 200.608° | $\epsilon$ = 2.06% |
| $\sigma$ = 0.410 | MDT = 18.0 | SWEPT AREA = 17.3" × 12.3" | |

| Nominal Scan Speed | | Maximum Carriage Acceleration | |
|---|---|---|---|
| in/sec | @ cpm | g's | @ cpm |
| 2.70 | 30 | 3.38 | 30 |
| 1.80 | 20 | 1.50 | 20 |
| 0.90 | 10 | 0.38 | 10 |

| Case 6 | | | |
|---|---|---|---|
| A = 4.199 | B = 2.519 | C = 5.878 | D = 5.038 |
| $\alpha$ = 358.029° | L = 12.884 | $\theta$ = 162.214° | $\epsilon$ = 1.55% |
| $\sigma$ = 0.403 | MDT = 3.2 | SWEPT AREA = 14.6" × 16.0" | |

| Nominal Scan Speed | | Maximum Carriage Acceleration | |
|---|---|---|---|
| in/sec | @ cpm | g's | @ cpm |
| 2.70 | 30 | 1.07 | 30 |
| 1.80 | 20 | 0.48 | 20 |
| 0.90 | 10 | 0.12 | 10 |

| Case 7 | | | |
|---|---|---|---|
| A = 3.874 | B = 2.324 | C = 5.578 | D = 4.648 |
| $\alpha$ = 353.926° | L = 12.331 | $\theta$ = 162.676° | $\epsilon$ = 2.15% |
| $\sigma$ = 0.439 | MDT = 3.0 | SWEPT AREA = 14.5" × 15.0" | |

| Nominal Scan Speed | | Maximum Carriage Acceleration | |
|---|---|---|---|
| in/sec | @ cpm | g's | @ cpm |
| 2.70 | 30 | 1.14 | 30 |
| 1.80 | 20 | 0.51 | 20 |
| 0.90 | 10 | 0.13 | 10 |

All of these mechanisms perform in a similar manner save for acceleration of the carriage and the swept area. By swept area it is meant that minimum rectangular area in which the input link, output link, and coupler link together with its extension move. Also, all seven cases scan a carriage over a scan distance of nine inches and maintain velocity within the specified velocity error ($\epsilon$). On the basis of lowest carriage accelerations and least swept areas, cases nos. 4 and 6 are particularly attractive.

From the above description, it will be appreciated that there has been described a simple, wholly mechanical drive system for driving a document scanning system at a constant velocity with a velocity error of 2% or less over the entire scan length. The absence of cams, clutches, cables, and pulleys reduces the cost and complexity of the scanning system with a single scan carriage.

Many modifications and variations are apparent from the foregoing description of the invention, and all such modifications and variations are intended to be within the scope of the present invention.

I claim:

1. Apparatus for scanning a stationary transparent platen on which an original document or other object may be placed for scanning thereof for the purpose of directing a light image of the document or other object generated by the scanning apparatus upon a moving image receiving member, comprising:
   a frame having said transparent platen fixedly mounted thereon;
   a carriage having a scanning means mounted thereon and being adapted to move relative to the frame;
   means for guiding the carriage along a path of travel parallel to the platen whereby successive incremental regions of the document or other object on said platen are scanned and the incremental light images formed by the scanning are directed to the image receiving member;
   a multiple link mechanism having an input link adapted for full revolutions at a constant speed and being slidably connected to the carriage for imparting thereto a straight line motion at constant speed, said imparted motion includes a forward direction from a start of scan position to an end of scan position and an automatic return to the start of scan position; and
   means for imparting a constant angular speed to the input link of said link mechanism without the need for return springs, cams, clutches, cables or pulleys, so that the forward scanning distance of the carriage is within a predetermined velocity accuracy.

2. The apparatus of claim 1, wherein the forward distance from the start of scan position to the end of scan position is nine inches or 22.86 cm; and wherein the carriage constant speed is suitable for making 10 to 30 scans per minute with a velocity error of about 2% or less.

3. The apparatus of claim 2, wherein the multiple link mechanism comprises a four-bar linkage mechanism.

4. The apparatus of claim 3, wherein the four-bar mechanism is either the crank-rocker or double crank type.

5. The apparatus of claim 3, wherein said four-bar mechanism comprises an input link, output link, coupler link, and a fixed link, the coupler link having an extension of predetermined length affixed to it, said extension being positioned at a predetermined angle $\alpha$ with respect to the coupler link and having its distal end slidably attached to the carriage.

6. The apparatus of claim 5, wherein said slidable attachment of the distal end of the extension comprises pivotal connection of the distal end of the extension to a slider, the slider residing in a slot in a connector plate fixedly attached to the carriage; and wherein the carriage is translatably attached to guide rails fixed to the frame via guide rollers.

7. The apparatus of claim 6, wherein the input, output, coupler, and fixed links and the extension attached to the coupler link all have predetermined lengths; and wherein the angle of orientation between the direction of carriage motion and the fixed link is a predetermined angle $\theta$.

8. The apparatus of claim 7, wherein the area of movement or swept area of the four-bar mechanism is 16.4 inches $\times$ 16.4 inches or less, and wherein the maximum carriage acceleration for 30 scans per minute is 1.22 g's or less.

9. The apparatus of claim 8 wherein the means for imparting a constant angular speed to the input link is an electric drive motor which need turn only in one direction at constant angular speed; and wherein the carriage executes both forward and return scans in response to the imparting speed from said electric motor to the input link of the four-bar mechanism.

10. The apparatus of claim 9, wherein the electric drive motor is directly coupled to said input link of the four-bar mechanism and is devoid of any clutch or discrete speed changing device interposed therebetween.

11. The apparatus of claim 10, wherein the four-bar mechanism may be oriented in a plane both parallel to or perpendicular to the transparent platen without loss of functionality of the mechanism.

* * * * *